(12) United States Patent
Rittweger

(10) Patent No.: US 8,733,414 B2
(45) Date of Patent: May 27, 2014

(54) PNEUMATIC VEHICLE TIRE WITH PROTECTED SIDEWALL MARKINGS

(75) Inventor: Stefan Rittweger, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 735 days.

(21) Appl. No.: 12/706,090

(22) Filed: Feb. 16, 2010

(65) Prior Publication Data

US 2010/0139832 A1 Jun. 10, 2010

Related U.S. Application Data

(63) Continuation of application No. PCT/EP2008/060915, filed on Aug. 21, 2008.

(30) Foreign Application Priority Data

Nov. 21, 2007 (DE) .......................... 10 2007 055 434

(51) Int. Cl.
B60C 13/00 (2006.01)
B60C 13/02 (2006.01)

(52) U.S. Cl.
USPC ........................................................ 152/523

(58) Field of Classification Search
USPC ........................................................ 152/525
See application file for complete search history.

(56) References Cited

U.S. PATENT DOCUMENTS

| 1,448,286 | A | | 3/1923 | Comstock |
| 1,458,629 | A | | 6/1923 | Raymond |
| D380,718 | S | * | 7/1997 | Ratliff, Jr. ................... D12/605 |
| 7,232,498 | B2 | | 6/2007 | Zimmer et al. |

FOREIGN PATENT DOCUMENTS

| EP | 796746 | * | 9/1997 |
| EP | 1 625 952 A1 | | 2/2006 |
| GB | 207 156 | | 1/1924 |
| JP | 59-190010 | * | 10/1984 |
| JP | 2002-211214 | * | 7/2002 |
| JP | 2005-125937 | * | 5/2005 |

OTHER PUBLICATIONS

International Search Report of PCT/EP2008/060915, dated Nov. 24, 2008.

* cited by examiner

*Primary Examiner* — Justin Fischer
(74) *Attorney, Agent, or Firm* — Laurence A. Greenberg; Werner H. Stemer; Ralph E. Locher

(57) ABSTRACT

A pneumatic vehicle tire has a profiled tread, two side walls, and at least one protective rib running on the surface of the side wall over its circumference. The protective rib is disposed above and with a spacing distance from a side wall marking or a side wall decoration. The protective rib has a lower negative contour with at least one recess, which is configured to correspond to the positive contour of the side wall marking or side wall decoration facing the protective rib, such that the protective rib at least partially accommodates the upper half of the side wall marking or side wall decoration in the recess.

11 Claims, 2 Drawing Sheets

PNEUMATIC VEHICLE TIRE WITH PROTECTED SIDEWALL MARKINGS

CROSS-REFERENCE TO RELATED APPLICATION

This application is a continuation, under 35 U.S.C. §120, of copending international application No. PCT/EP2008/060915, filed Aug. 21, 2008, which designated the United States; this application also claims the priority, under 35 U.S.C. §119, of German patent application No. DE 10 2007 055 434.8, filed Nov. 21, 2007; the prior applications are herewith incorporated by reference in their entirety.

BACKGROUND OF THE INVENTION

Field of the Invention

The invention lies in the field of vehicle tires. More specifically, the invention relates to a pneumatic vehicle tire having a profiled tread, two sidewalls, and at least one protective rib, which runs on the surface of the sidewall over the circumference of the sidewall. The protective rib is disposed above and at a distance from a sidewall marking or a sidewall decoration.

The protective ribs on tire sidewalls, which are disposed above and at a distance from a sidewall marking or a sidewall decoration to protect the sidewall marking or sidewall decoration from scuffing contacts, such as for example contacts with the curb, are known in the prior art. The marking or the decoration is intended to be protected from scuffing contacts in order to preserve their legibility over the lifetime of the tire, but also to prevent cracks from being initiated by notching effects. The protective rib is usually a strip or wedge of rubber which is connected as one part with the sidewall, runs over at least part, usually over the circumference of the entire tire sidewall, and which has a greater relief height than the remaining tire sidewall. The cross-sectional contour of the protective rib may be different in different embodiments. The protective rib is disposed at such a cross-sectional height of the tire sidewall at which it can protect the sidewall marking or decoration from lateral scuffing contacts by the protective rib intercepting these contacts. It is generally a common feature of the aforementioned protective ribs that, when viewed in the cross section of the tire, they have a lower and an upper edge contour that remains the same over the circumference of the tire, wherein the lower and upper contours run parallel to one another, so that the cross-sectional height of the protective rib is the same over the circumference of the tire.

Such a protective rib is described in U.S. Pat. No. 1,458,629. There, the tire sidewall has a protective rib which runs over the circumference of the tire sidewall and protects the sidewall marking disposed below this protective rib from scuffing contacts. The cross-sectional contour of the protective rib is the same in relief height and cross-sectional height over the circumferential progression thereof over the sidewall.

In order to be able to protect the markings or decorations of the sidewall reliably by such a cross-sectional contour of the protective rib that is the same throughout the progression thereof over the circumference of the sidewall, the protective rib must have a comparably great relief height. This greater relief height requires a great amount of material to be used and increases the weight of the tire undesirably.

SUMMARY OF THE INVENTION

It is accordingly an object of the invention to provide a pneumatic vehicle tire with protected sidewall markings which overcomes the disadvantages of the heretofore-known devices and methods of this general type and which provides for a vehicle tire having a protective rib protecting the sidewall marking or the sidewall decoration from scuffing contacts in which the marking or the decoration is reliably protected, but only requires a small additional amount of material to be used and consequently only increases the weight of the tire insignificantly.

With the foregoing and other objects in view there is provided, in accordance with the invention, a vehicle tire, comprising:
a profiled tread and two sidewalls;
a sidewall marking on one of said sidewalls, said sidewall marking having an upper half with a positive contour;
a protective rib running on a surface of said one of said sidewalls over a circumference of said sidewall substantially above and a with spacing distance from said sidewall marking; and
said protective rib having a lower negative contour with at least one recess formed therein, said lower negative contour being formed to correspond to the positive contour of said sidewall marking facing said protective rib and to accommodate said upper half of said sidewall marking in said recess of said protective rib.

In other words, the objects of the invention are achieved by the protective rib having a lower negative contour with at least one recess, which is configured to correspond to the positive contour of the sidewall marking or the sidewall decoration (generically referred to as sidewall marking) facing the protective rib, in such a way that the protective rib accommodates at least part of the upper half of the sidewall marking or the sidewall decoration in the recess. It is primarily important to the invention that the upper region of the sidewall marking or the sidewall decoration represents a positive contour (or else positive relief), which engages in a correspondingly configured recess in the form of a negative relief/contour which is disposed in the lower region of the protective rib. The sidewall marking consequently engages in lower recesses in the protective rib, so that the decoration or the marking is as it were "housed" by the protective rib in its upper region, whereby the marking or decoration is protected very reliably from scuffing contacts. The protective rib has a planar upper contour without recesses, while the lower contour has recesses for accommodating upper parts of the sidewall marking or the sidewall decoration.

In order to achieve the greatest possible protective effect for the sidewall marking or the sidewall decoration from scuffing contacts, it is advantageous if the protective rib has a greater relief height than the sidewall marking or the sidewall decoration, preferably at least a relief height that is greater by 0.3 mm.

Relative to the cross section of the tire, the protective rib is expediently disposed within a region of the height of the sidewall that lies above half the height of the sidewall and below the upper quarter of the height of the sidewall. In this respect, the region of the cross-sectional height that is facing the rim is known as the lower part. On account of the cross-sectional contour of the tire, in particular the cross-sectional contour of truck tires, this is the region that is exposed to possible scuffing contacts. A protective rib disposed in this region reliably intercepts these scuffing contacts and protects the marking or decoration disposed below the protective rib.

In one embodiment, each letter facing the protective rib or each decorative element facing the protective rib is disposed in an engaging manner in a corresponding recess of the same contour in the protective rib. Consequently, each individual letter of an inscription is disposed in a separate recess.

In another embodiment, the entire inscription facing the protective rib or the decoration facing the protective rib is disposed in an engaging manner in a single corresponding recess of the same contour in the protective rib. Consequently, the entire marking is disposed in a single recess.

The greatest possible protection for the marking or the decoration is obtained along with good legibility if the distance between the recess in the lower contour of the protective rib and the upper contour of a letter or a decorative element is between 1 mm and 5 mm, preferably 2 mm to 3 mm.

The protection of the letters or the decoration is further improved if at least one further peripheral protective rib is disposed below the letters or the decoration to protect the letters or the decoration.

Other features which are considered as characteristic for the invention are set forth in the appended claims.

Although the invention is illustrated and described herein as embodied in a pneumatic vehicle tire having protected sidewall marking, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
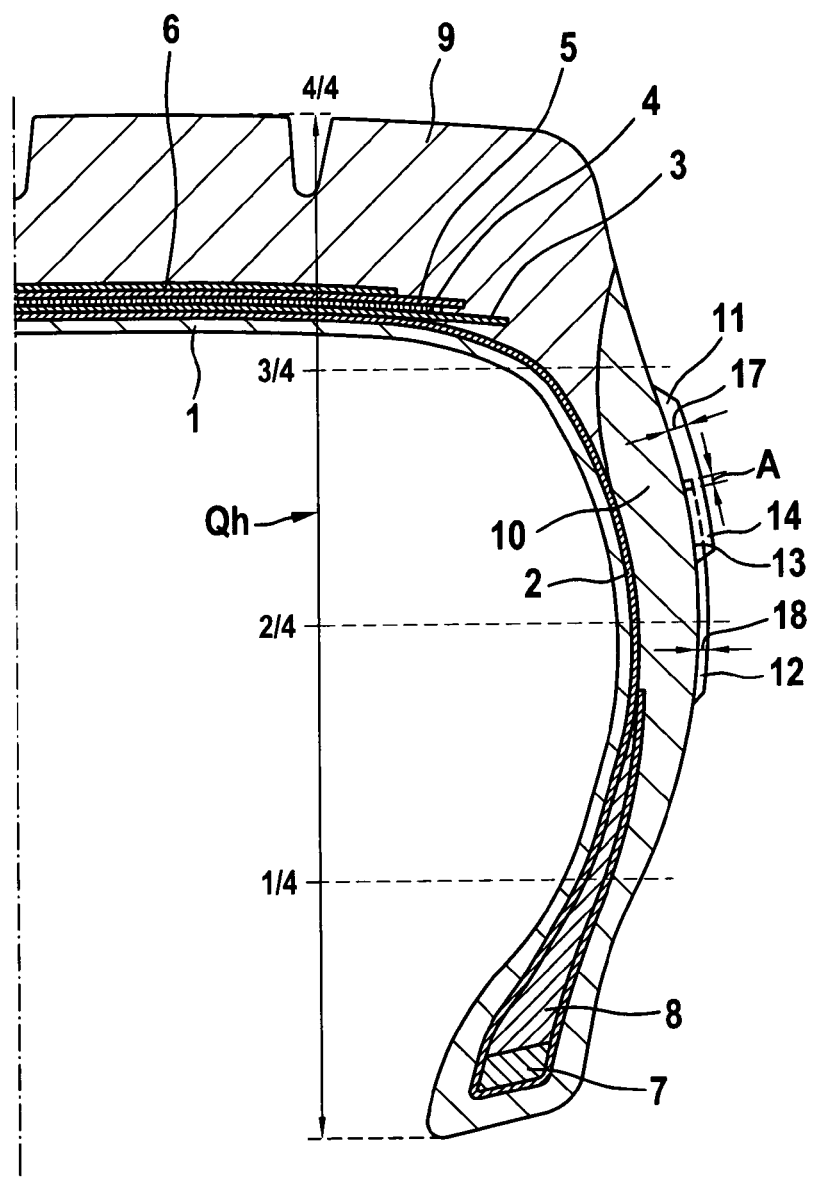
FIG. 1 shows a half cross section through a tire of a utility vehicle according to the invention.

Referring now to the figures of the drawing in detail and first, particularly, to FIG. 1 thereof, there is shown a cross section taken through a tire of a commercial vehicle or utility vehicle. The tire has an airtight inner layer 1 and a carcass 2, which has in particular steel cords as reinforcing elements. The tire further has a breaker belt assembly comprising four plies 3, 4, 5 and 6, sidewalls 10, bead regions with bead cores 7 and bead fillers 8 and a profiled tread 9. The carcass 2 is a radial carcass, the steel cords of which run substantially parallel to one another in the radial direction from bead region to bead region. In the case of the embodiment represented, the fourth, radially outermost belt ply 6 is the narrowest of all the plies and forms the so-called protective ply. The first belt ply 3 is the barrier ply, the second and third belt plies 4, 5 are the so-called working plies. The belt plies 3, 5 and 6 consist of steel cord filaments which are embedded in a rubber compound, the belt rubber mix, and run parallel to one another in each of the plies 3, 5 and 6. The angle with the circumferential direction that is formed by the steel cord filaments in the belt plies 3, 5 and 6 is chosen in particular between 16° and 25°. The mutual arrangement of the steel cord filaments in the belt plies 3, 5 and 6 is in this case disposed in such a way that the steel cord filaments on the successive belt plies cross one another.

A protective rib 11 is disposed on the axially outer surface of the sidewall 10, running over the circumference of the sidewall. The protective rib 11 is formed to protect a sidewall marking 12, disposed below and at a distance from the protective rib, from lateral scuffing contacts, such as for example from contacts with the curb, in that the protective rib 11 intercepts these contacts.

Figure 2:
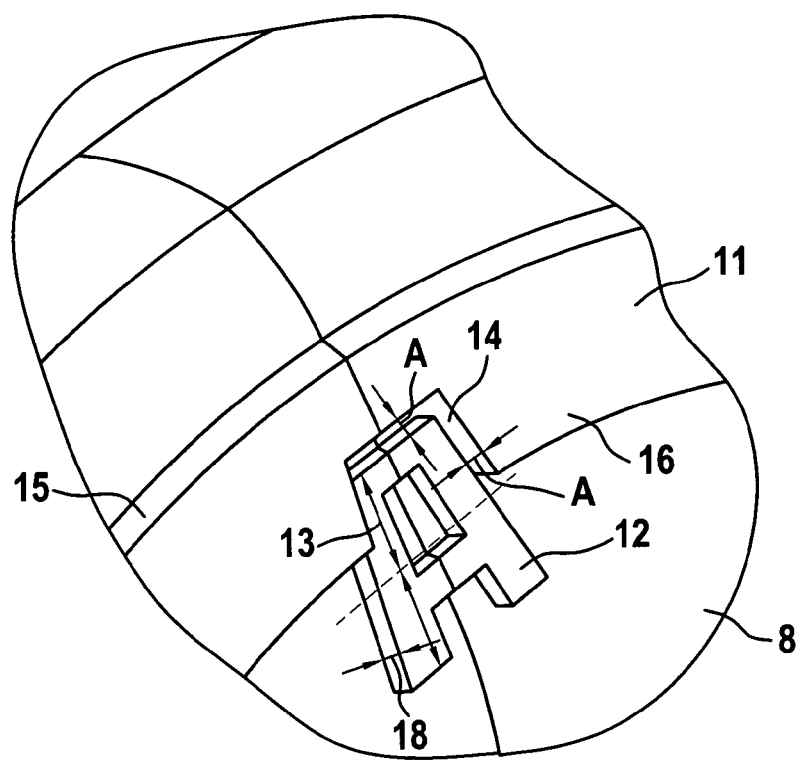
FIG. 2 shows a perspective partial view of the upper tire sidewall with a scuffing strip and a letter.

FIG. 2 shows the embodiment of FIG. 1 in a perspective partial view of the upper tire sidewall 10 with a protective rib 11 and a sidewall marking 12 in the form of a letter. The same components of the two figures are identified by the same reference numerals and reference characters. The upper region of the sidewall marking 13 represents a positive contour (or else positive relief), which engages in a correspondingly configured recess 14 in the form of a negative contour which is disposed in the lower region of the protective rib. The sidewall marking 12 consequently engages in a lower recess 14 in the protective rib 11, so that the marking 12 is, as it were, "housed" by the protective rib 11 in its upper region 13, whereby the marking or decoration is protected very reliably from scuffing contacts. The protective rib 11 has a planar upper contour 15 without recesses, while the lower contour 16 has a recess 14 for partially accommodating the letter of the sidewall marking 12. To ensure good visual perceptibility of the marking 12, the marking 12 is accommodated at most with its upper half 13 in the recess 14 of the protective rib 11.

The protective rib 11 has a relief height 17 greater by 0.5 mm than the relief height 18 of the sidewall marking 12. The protective rib 11 is disposed within a cross-sectional height Qh (i.e., a radial height) of the sidewall 10 that lies above half the height Qh of the sidewall 10 and below the upper quarter of the height Qh of the sidewall 10. The spacing distance between the lower contour surface of the recess of the protective rib 11 and the upper contour surface of the letter 12 is 3 mm.

The invention claimed is:

1. A vehicle tire, comprising:
a profiled tread and two sidewalls;
a sidewall marking on one of said sidewalls and projecting laterally from said sidewall with a given relief height, said sidewall marking having a lower half and an upper half with a positive contour;
a protective rib running on a surface of said one of said sidewalls over a circumference of said sidewall substantially above and with spacing distance from said sidewall marking, said protective rib projecting laterally from said sidewall with a relief height that is greater than said given relief height of said sidewall marking; and
said protective rib having a lower negative contour with at least one recess formed therein, said lower negative contour being formed to correspond to the positive contour of said sidewall marking facing said protective rib and to accommodate said upper half of said sidewall marking in said recess of said protective rib, said upper half of said sidewall marking projecting upwardly into said recess of said protective rib and said lower half lying below said protective rib.

2. The pneumatic vehicle tire according to claim 1, wherein said protective rib has a greater relief height than a relief height of said sidewall marking.

3. The pneumatic vehicle tire according to claim 2, wherein the relief height of said protective rib is greater than the relief height of said sidewall marking by approximately 0.3 mm.

4. The pneumatic vehicle tire according to claim 1, wherein said sidewall has a given radial height and wherein said protective rib is disposed within a region of the height of said sidewall lying above half the height of said sidewall and below an upper quarter of the height of said sidewall.

5. The pneumatic vehicle tire according to claim 1, wherein said sidewall marking includes at least one letter and/or at least one decorative element, and wherein each said letter facing said protective rib and/or each said decorative element facing said protective rib is disposed to engage in a corresponding recess of a same contour formed in said protective rib.

6. The pneumatic vehicle tire according to claim 1, wherein said sidewall marking includes an inscription facing said protective rib and engaging in a corresponding recess of a corresponding contour formed in said protective rib.

7. The pneumatic vehicle tire according to claim 1, wherein said sidewall marking includes a decoration engaging in a corresponding recess of a corresponding contour formed in said protective rib.

8. The pneumatic vehicle tire according to claim 1, wherein a spacing distance between a lower contour surface of said protective rib and an upper contour surface of said sidewall marking lies between 1 mm and 5 mm.

9. The pneumatic vehicle tire according to claim 1, wherein a spacing distance between a lower contour surface of said protective rib and an upper contour surface of said sidewall marking lies between 2 mm and 3 mm.

10. The pneumatic vehicle tire according to claim 1, which comprises at least one further peripheral protective rib disposed below said sidewall marking for protecting said sidewall marking.

11. A vehicle tire, comprising:
a profiled tread and two sidewalls;
a protective rib running circumferentially around the tire on a surface of at least one of said sidewalls;
a sidewall marking on said one of said sidewalls formed partly next to said protective rib and partly projecting into a recess formed in a lower edge of said protective rib, with a lower portion of said sidewall marking formed on a free surface of said one of said sidewalls substantially without a protective rib flanking said lower portion of said sidewall marking;
said sidewall marking being disposed with a spacing distance from respectively adjacent walls forming said recess in said protective rib; and
said protective rib and said sidewall marking projecting from said sidewall with a given relief height, with the relief height of said protective rib being greater than the relief height of said sidewall marking.

* * * * *